(No Model.)

G. E. BURT.
TRACTION CHAIN GEARING.

No. 325,654. Patented Sept. 8, 1885.

Witnesses:
Emory B. Page,
Hattie S. Hildreth.

Inventor:
George E. Burt.

UNITED STATES PATENT OFFICE.

GEORGE E. BURT, OF HARVARD, MASSACHUSETTS.

TRACTION-CHAIN GEARING.

SPECIFICATION forming part of Letters Patent No. 325,654, dated September 8, 1885.

Application filed March 18, 1885. (No model.)

*To all whom it may concern:*

Be it known that I, GEORGE E. BURT, a citizen of the United States, residing at Harvard, in the county of Worcester and State of Massachusetts, have invented a new and useful Improvement in Traction-Chain Gearing, of which the following is a specification.

My invention relates to mechanism for transmitting power to actuate machinery to increase or diminish speed, and is particularly applicable to agricultural machines—those that are propelled by supporting-wheels; and the object of my improvement is to dispense with cogged gearing and substitute a lighter and cheaper mechanical device, and enable the manufacturer to use the common wrought-iron chain of commerce to propel the machine; also, to construct and arrange the propelling parts in such a manner that they will be self-adjusting, and automatically provide for wear and lengthening of the propelling-chains, and transmit power without the use of cogs to mesh the links, and chains of various lengths of links may be effectually employed; also, to arrange the mechanism to relieve the bearings of strain and diminish the friction.

This invention may be readily applied to manure-spreaders and soil-pulverizers, hay-tedders, mowers, and horse-powers, &c.

It is well known that the common-constructed chain-gearing must be exactly of the pitch of the cogs, and the length of the chain-links must be the same, to run freely together. It is also known that the links and pivots soon wear and the chain lengthens. This causes the machine so driven to run hard, and finally the links will climb the cogs, and will break the cogs or links or stop the machine. These links are usually made of sections of punched plates and riveted, and are expensive, and, when a rapid motion is required, are too expensive to be practical; and when cogs are not employed the chain, in order to transmit any power, must be made so taut as to strain the shafting and cause extra friction on the bearings, which will cause great loss of power. I obtain these objects by mechanism illustrated in the accompanying drawings, in which—

Figure 2:
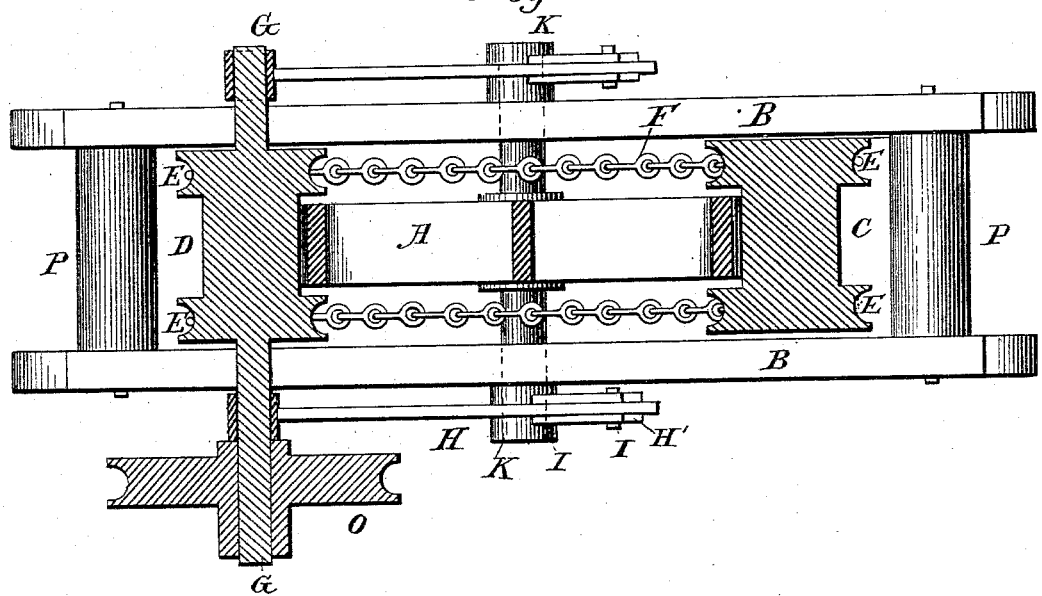
Figure 1:
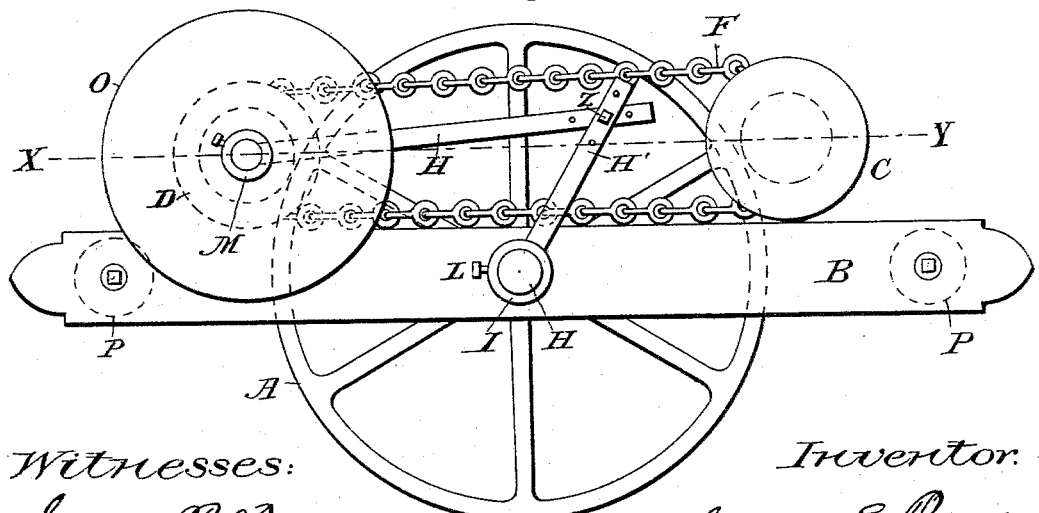

Figure 1 is a side view. Fig. 2 is a longitudinal section through the center of the propelling mechanism.

Similar letters refer to similar parts.

A represents a supporting-wheel. B is the frame held together by cross-bars P P.

C and D are the actuating-cylinders constructed with flanges and recesses E E, into which the propelling-chain F F runs. (See Fig. 2.) Cylinder D is firmly fixed onto shaft G, and is hung pendent by arms H H and pivot Z, which are connected with seats I to axle K, and is held in position by set-screw L. Arms H H are constructed with oblong seats M for shaft G, to which is fixed the pulley O. The actuating-cylinders C D are arranged to rest on the periphery of the supporting-wheel A at chord-line X Y, above the center line, R, at a point where the cylinders C D will impinge slightly on the wheel A surface. The actuating-chain F should be of sufficient length to hold the cylinder C in position with cylinder D, which is held in any desirable position on the wheel A by arms H H and set-screws L L. (See Fig. 1.)

When this invention is applied to manure-spreaders or a hay-tedder or soil-pulverizer, it is attached to the supporting-wheel A, as substantially shown in Fig. 1, and, the team being attached to the machine in the usual manner, it operates as follows:

Operation: As the wheels to which this mechanism is attached roll on the ground in the direction shown by the arrows, the actuating-cylinders being in contact with the periphery of the wheel A, the cylinders move in opposite direction and take up all the slack of the chain. This action causes the two cylinders which rest on the chord X Y to grasp the propelling-wheel A, and the slack of the chains being all taken up, the cylinders revolve with the wheel A, and all the moving power of the cylinder C is, by the means of the propelling-chains F F, transmitted to actuating-cylinder D, and all the propelling force of wheel A is transmitted to propel the shaft G, to which the pulley O is fixed, (see Fig. 2,) or, when attached to a hay-tedder or a manure spreader and pulverizer, will have the same results. Chains F F pass around outside of the actuating-cylinders C D, embrace the wheel A, and the entire stress and force of transmitting the propelling-power comes on the surface of the cylinders and wheel A, thus relieving the journals of strain and friction and utilizing the friction to propel the work.

The cylinder C, when once adjusted and placed in position on the wheel A and cylinder D, will be automatic-adjusting. As the chain wears longer by use, the cylinder C will move down on the periphery of wheel A, and as it approaches the diameter-line V V the cylinders C and D will grasp the wheel A more firmly, and if it is much worn by continued use a link can be removed and the chain and cylinders be again in position to run with a chain, operating just as effectually as when new.

Speed may be diminished or increased by multiplying the propelling-wheels and actuating-cylinders and chains substantially as belting and gearing are used.

By this device the chain-gearing may be practically used in a more rapid motion than the usually-constructed chain-gearing. It is simple and very much lighter than cogs, and cheaper and more durable than the common chain-gearing, runs with less friction, and is more easily repaired and readily adjusted.

Having described my invention, what I claim as new, and desire to secure by Letters Patent, is—

1. The supporting-wheel A, the actuating-cylinders C D, and propelling-chains, constructed and arranged substantially as described, for the purpose set forth.

2. Traction-chain gearing constructed with actuating-cylinders arranged to rest on the chord of a circle and held in position on the periphery of a supporting-wheel by propelling-chains, substantially as described.

3. Traction-chain gearing constructed with a supporting-wheel and arranged with cylinders automatically operated, and propelling-chain to transmit power to actuate machinery, substantially as described.

4. The supporting-wheel A, actuating-cylinders C and D, propelling-chain F F, shaft G, arms H H, and axle K, constructed and arranged substantially as described, for the purpose set forth.

5. In combination with a supporting or propelling wheel, actuating-cylinders D and C, propelling-chain Y Y, and arms H H, arranged substantially as described.

GEORGE E. BURT.

Witnesses:
HATTIE S. HILDRETH,
E. E. BURT.